United States Patent [19]

Canuteson

[11] Patent Number: 5,704,589
[45] Date of Patent: Jan. 6, 1998

[54] YOKE FOR MOUNTING ON A GAS TANK

[75] Inventor: Robert M. Canuteson, Denton, Tex.

[73] Assignee: Victor Equipment Company, Denton, Tex.

[21] Appl. No.: 542,450

[22] Filed: Oct. 12, 1995

[51] Int. Cl.[6] .................................................. F16K 51/00
[52] U.S. Cl. ........................ 251/291; 251/148; 137/557; 137/613
[58] Field of Search ........................... 137/613, 557; 251/291, 292, 148

[56] References Cited

U.S. PATENT DOCUMENTS

| | | | |
|---|---|---|---|
| 987,000 | 3/1911 | Lukens | 251/291 |
| 2,119,473 | 5/1938 | Smith et al. | 137/613 |
| 3,147,761 | 9/1964 | Lecoco | 251/148 |
| 3,606,390 | 9/1971 | Taylor | 285/39 |
| 3,809,121 | 5/1974 | Harris | 251/148 |
| 3,929,152 | 12/1975 | Graham | 251/201 |
| 4,554,944 | 11/1985 | Daghe et al. | 137/296 |
| 5,282,493 | 2/1994 | Schwartz et al. | 251/148 |
| 5,312,084 | 5/1994 | Weh | 251/148 |

OTHER PUBLICATIONS

Compressed Gas Cylinder Valve Outlet and Inlet Connections; Compressed Gas Association, Inc. 1987, pp. 78–80.

*Primary Examiner*—A. Michael Chambers
*Attorney, Agent, or Firm*—Senniger, Powers, Leavitt & Roedel

[57] ABSTRACT

A gas tank valve and yoke for mounting gas passaging structure on the valve in which a gas tank valve stem and yoke set screw are both adapted to be engaged by a single wrench. The same wrench turns the valve stem to open and close the gas tank valve, and turns the set screw into secure engagement with the gas tank valve to hold the yoke in a fixed, self-retaining position on the valve. A torque rod is connected to the outer end portion of the set screw for conjoint rotational movement with the set screw about the longitudinal axis of the set screw for turning the set screw. Pin and hole arrangements on the yoke and valve body are provided to discriminate against using an undesired gas or gas passaging structure.

14 Claims, 4 Drawing Sheets

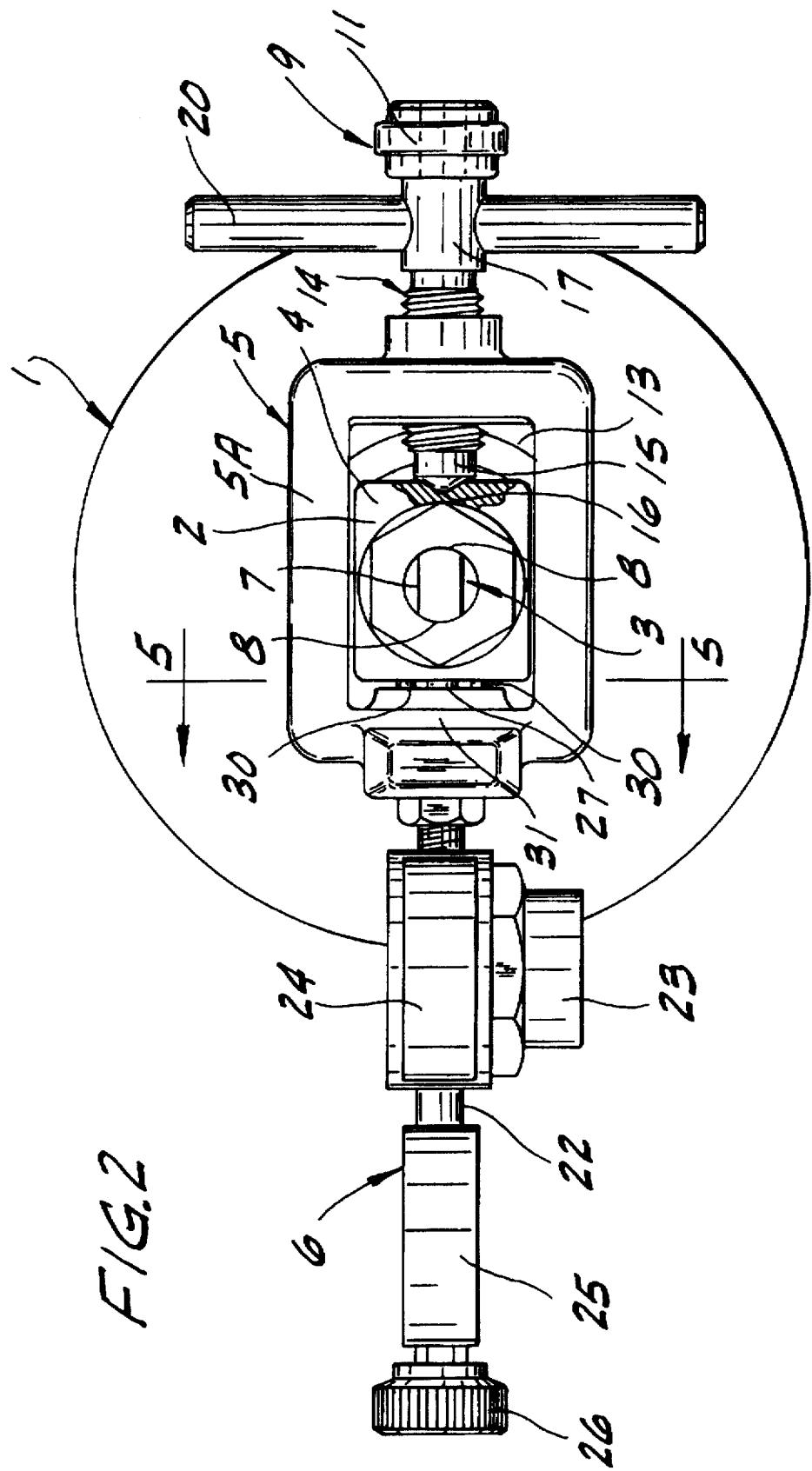

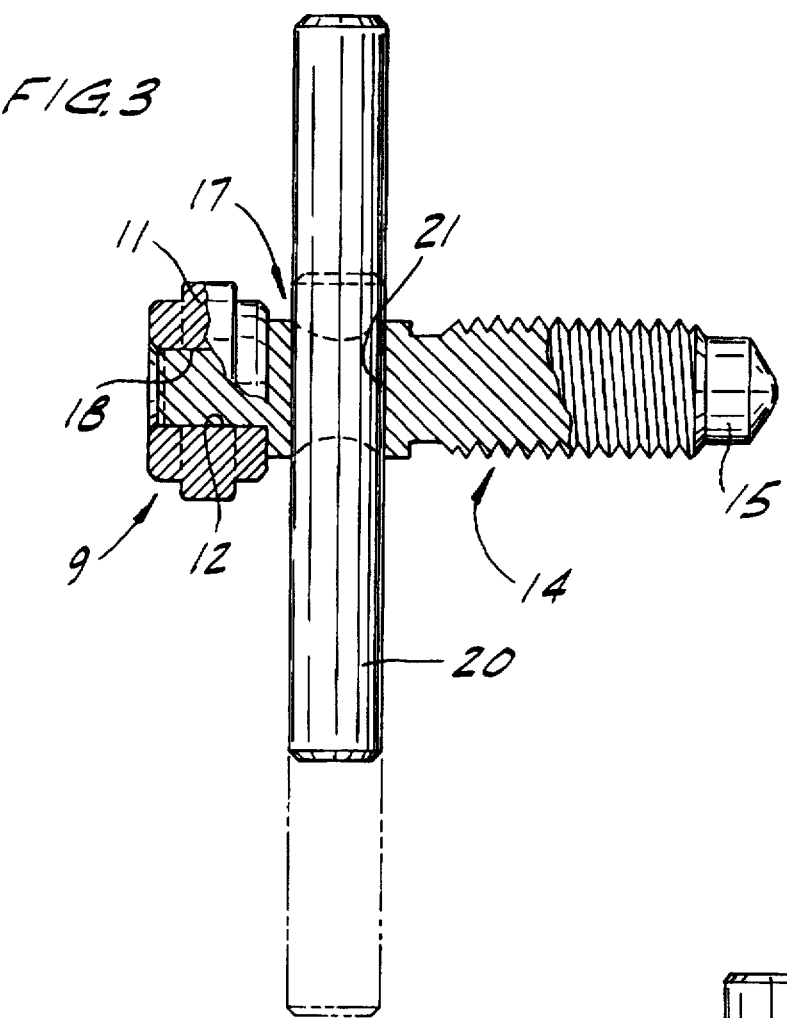
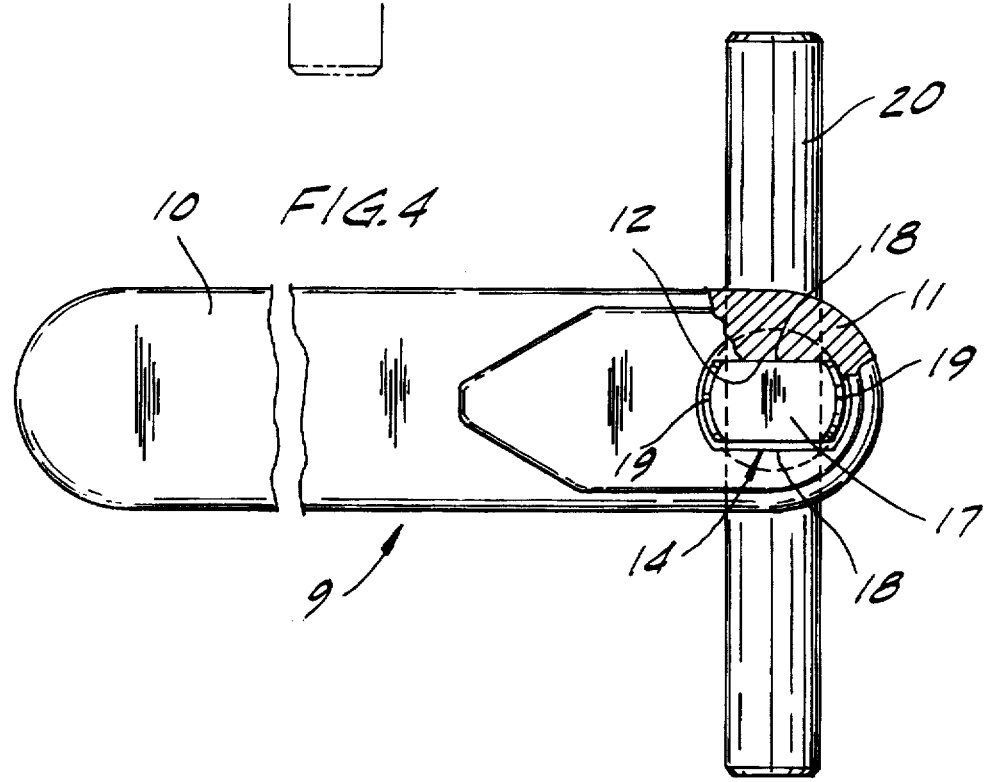

5,704,589

YOKE FOR MOUNTING ON A GAS TANK

BACKGROUND OF THE INVENTION

This invention relates generally to yokes of the type used to mount gas lines and gas flow regulator and measurement equipment on a gas tank.

Yokes of the type to which this invention relates typically support a gas line segment, a coupling element, a pressure regulator, gas tank contents gauge and flow indicator gauge, all of which will be referred to collectively as gas passaging structure. A yoke of this type is mounted on a valve body at the top of a cylinder containing gas and couples the gas passaging structure to the valve for delivery of the gas from the tank. The yoke is generally annular and receives the valve body in a central opening. A set screw threadably mounted on the yoke is screwed into engagement with the valve body to securely clamp the yoke in a self-retaining position on the valve body. The coupling element on the yoke engages an orifice in the valve body as the yoke is drawn tight against the valve body by the set screw. The valve may then be opened to permit gas to flow into the gas passaging structure.

The present invention has particular, although not exclusive application in the field of providing supplemental oxygen to patients. It will be necessary to periodically change tanks as one is emptied. To do so, the valve on the tank is closed and the yoke removed. The valve and tank are taken away to be refilled. The yoke is then applied to a valve on a new oxygen tank. Often patients needing supplemental oxygen are infirm, making it difficult for them to open the valve or to secure the yoke on the valve body. In that regard, it is known to provide a wrench which will fit onto one end of the set screw and also onto the top of a valve stem of the valve for applying torque to both the set screw and valve stem. The patient must take the wrench off of the set screw and then apply it to the valve. Moreover, there has been no provision of any augmentation to the wrench for applying torque to the set screw.

SUMMARY OF THE INVENTION

Among the several objects of this invention may be noted the provision of an improved yoke for mounting gas passaging structure on a gas tank; the provision of such a yoke which is readily secured to the gas tank by persons in a weakened or infirm state; the provision of such a yoke which carries its own torque applicator; the provision of such a yoke which permits the applicator to move to a position of maximum lever arm for applying torque and which stows the torque applicator out of the way when not in use; the provision of such a yoke which permits simultaneous application of torque from the torque applicator and a wrench; the provision of such a yoke that prevents the user from connecting the yoke to a tank other than one containing a predetermined gas (e.g., oxygen); and the provision of such a yoke which is inexpensive to manufacture and easy to use.

In general, the combination of the present invention includes a gas tank valve and a yoke for mounting gas passaging structure on the valve. The gas tank valve comprises a valve body with a valve stem mounted on the valve body for turning relative to the valve body to open and close the valve. The valve stem has a pair of flats on opposite sides of the valve stem adapted to be engaged by a wrench for turning the valve stem. The flats are spaced apart a first distance. The yoke comprises a generally central opening sized and shaped for receiving at least a portion of the valve body therethrough. A set screw is adapted to extend through the yoke and threadably engage the yoke. The set screw has an inner end portion capable of engaging the valve body in the central opening of the yoke for releasably mounting the yoke on the valve body. The set screw has an outer end portion extending outwardly from the yoke. The outer end portion has a pair of flats on opposite sides of the set screw which are adapted to be engaged by the wrench for turning the set screw into engagement with the valve body. The flats on the set screw are spaced apart a second distance substantially equal to the first distance by which the flats of the valve stem are spaced apart, whereby the same wrench used for turning the valve stem may be used for turning the set screw. A torque rod is connected to the set screw for conjoint rotational movement with the set screw about the longitudinal axis of the set screw for turning the set screw to bring it into secure engagement with the gas tank valve thereby to hold the yoke in a fixed, self-retaining position on the valve.

Other objects and features will be in part apparent and in part pointed out hereinafter.

BRIEF DESCRIPTION OF THE DRAWINGS

FIG. 2 is a top plan view thereof;

FIG. 3 is an elevation of the set screw and a wrench applied thereto with parts broken away to show details of construction;

FIG. 4 is an end view of the set screw and wrench of FIG. 3.

Corresponding parts are indicated by corresponding reference numerals throughout the several views of the drawings.

DETAILED DESCRIPTION OF THE PREFERRED EMBODIMENT

Figure 1:
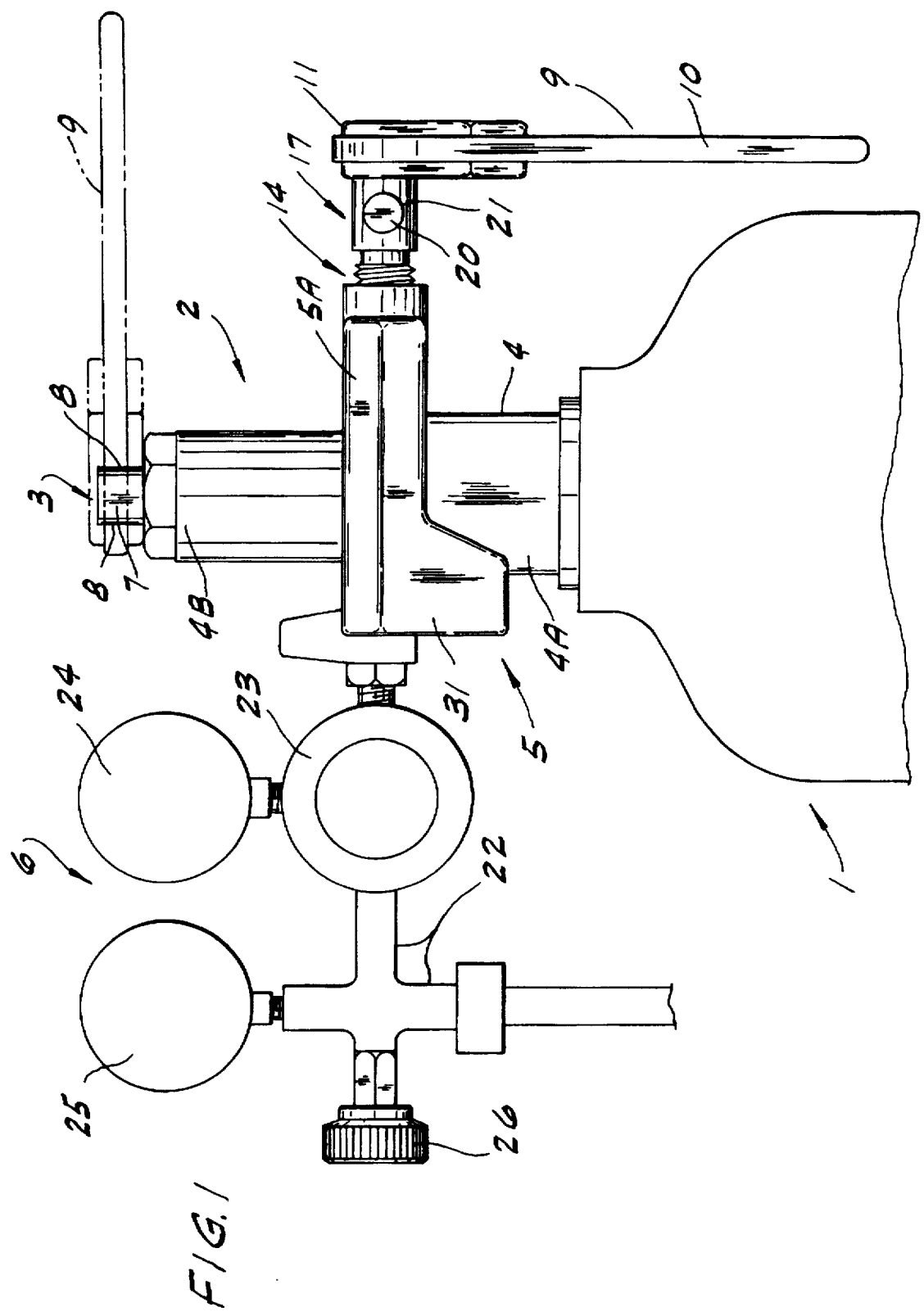
FIG. 1 is a fragmentary elevation of a gas tank showing a yoke connected to the gas tank valve body and supporting gas passaging structure.

Now referring to the drawings, and particularly to FIGS. 1 and 2, the reference numeral 1 generally indicates a gas tank containing pressurized gas such as oxygen. A valve, generally indicated at 2, is connected to the tank in a conventional manner. A valve stem, generally indicated at 3, is mounted on a lower rectangular portion 4A of a valve body 4. The valve body also has an upper cylindrical portion 4B. The valve stem 3 can be turned relative to the valve body 4 to open and close the valve. The construction and operation of the valve 2 are well known to those of ordinary skill in the art, and will not be described in detail herein. A yoke (indicated generally at 5) mounts gas passaging structure (indicated generally at 6) on the valve for metered delivery of the oxygen to, for instance, a person needing supplemental oxygen. It is to be understood that the yoke 5 may be used in other contexts, such as for delivery of other medical gases. However, for purposes of the following description, the yoke 5 will be described as it is used for connecting the gas passaging structure 6 to the oxygen tank 1 for providing supplemental oxygen.

The valve stem 3 has a pair of flats 7 on opposite sides of the valve stem which are spaced apart by a first predetermined distance. Surfaces 8 of the valve actuator extending between the flats 7 are curved, having a first predetermined radius of curvature. A wrench, generally indicated at 9, has a handle 10 and a head 11, and may be used to turn the valve stem 3. An opening 12 in the head 11 of the wrench 9 has a shape conforming to the cross sectional shape of the valve stem 3 at its upper end. The wrench 9 engages the flats 7 and the curved surfaces 8 in the opening 12 so that the wrench and valve stem 3 are connected for conjoint rotation about the axis of the valve stem. Thus, the wrench 9 may be used to apply the torque necessary to open and close the valve 2.

The yoke 5 includes a rectangular (as seen in FIG. 2) ring 5A having a rectangular central opening 13 sized and shaped to receive the valve body 4. A threaded hole (not shown) in one side of the yoke receives a set screw, generally indicated at 14, which extends through the hole and is threadably interengaged with the yoke 5 in the hole. An inner end 15 of the set screw 14 extends into the generally central opening 13 of the yoke 5, and is shaped to engage the valve body 4 for releasably mounting the yoke in a fixed, self-retaining position on the valve body. The inner end 15 of the set screw 14 is tapered to seat in an indentation 16 in the side of the valve body 4. As shown in FIG. 4, an outer end portion 17 of the set screw 14 extends outwardly from the yoke 5 and has a pair of flats 18 on opposite sides of the set screw. The flats 18 are spaced apart a second predetermined distance that is substantially equal the first predetermined distance by which the flats 7 on the valve stem 3 are spaced apart. In a preferred embodiment the distance by which the flats 7 of the valve stem 3 and flats 18 of the set screw 14 are spaced apart approximately 0.2 inches. Surfaces 19 extending between the flats 18 have a second predetermined radius of curvature that is substantially equal the radius of curvature of the curved surfaces 8 extending between the flats 7 on the valve stem 3. The same wrench 9 which fits onto the valve stem 3 also fits onto the outer end 17 of the set screw 14. The wrench 9 is used to turn the set screw 14 until the set screw securely engages the valve body 4 to hold the yoke 5 in a fixed, self-retaining position on the valve.

To provide an alternative or augmentation for turning the set screw 14 with the wrench 9, a torque rod 20 is connected to the set screw for conjoint rotational movement with the set screw about the longitudinal axis of the set screw. The torque rod 20 extends through a diametrical hole 21 in the outer end 17 portion of the set screw 14, between the flats 18 at the outer end of the set screw and the threaded inner end 15 of the set screw. In a first embodiment, the torque rod 20 is fixedly attached to the set screw 14 in the diametrical hole 21 to prevent lateral movement of the torque rod relative to the set screw. The ends of the torque rod 20 extend laterally away from the set screw 14 an equal distance on either side of the set screw (as shown in solid in FIG. 3). To use the torque rod 20 in this embodiment, both ends of the torque rod are grasped in one hand and rotated about the longitudinal axis of the set screw 14 to apply a torque to the set screw. The torque rod 20 turns the set screw 14 until it securely engages the valve body 4 to hold the yoke 5 in a fixed, self-retaining position on the valve.

In a second embodiment, the torque rod 20 is fixedly attached to the set screw 14 in the diametrical hole 21 in the position indicated in phantom in FIG. 3. In that position, one end of the torque rod 20 extends laterally away from the set screw 14 a distance providing a maximum lever arm for turning the set screw, and the other end is disposed in the hole 21. To use the torque rod 20 in this embodiment, the torque rod is grasped near its outer end and rotated about the longitudinal axis of the set screw 14 to apply a torque to the set screw.

In a third embodiment, the torque rod 20 is slidably received in the diametrical hole 21 in the set screw 14 to allow sliding lateral movement of the torque rod relative to the set screw between a stowed position and a use position. The torque rod 20 is preferably held from sliding out of the hole 21 by enlargement of its ends (not shown) or another conventional construction. In the stowed position (shown in solid lines in FIG. 3), the torque rod 20 extends laterally away from the set screw 14 a minimum distance on either side so that it is out of the way. In the use position (shown in phantom in FIG. 3), the torque rod 20 extends laterally away from the set screw 14 a distance providing a maximum lever arm for applying torque to the set screw. To use the torque rod 20 for turning the set screw 14, the torque rod is slid laterally to the use position, grasped near its outer end and rotated about the longitudinal axis of the set screw to apply a torque to the set screw.

The gas passaging structure 6 supported by the yoke 5 includes in this embodiment gas flow lines 22 (broadly, "gas passaging means"), a pressure regulator 23, a gas tank contents gauge 24, a flow indicator gauge 25, and a flow control knob 26. A first coupling member of the gas passaging structure 6 comprises in the illustrated embodiment a coupling stem 27 extending through the yoke ring 5 and into the central opening 13. The coupling stem 27 is capable of mating with a second coupling member comprising in this embodiment an orifice 28 in the valve body 4. The coupling stem 27 is drawn into the valve orifice 28 by threading the set screw 14 against the valve body 4. A seal (not shown) carried by the coupling stem 27 engages the valve body 4 around the orifice 28 for a sealing connection of the coupling stem in the valve orifice so that when the valve stem 3 is turned to open the valve, oxygen flows out of the tank 1 and into the gas lines 22 without leakage. This coupling arrangement is of conventional construction. Once in the gas flow lines 22, the gas flow delivered to the patient is controlled by turning the flow control knob 26 to open and close the gas lines leading from the valve 2.

Figure 5:
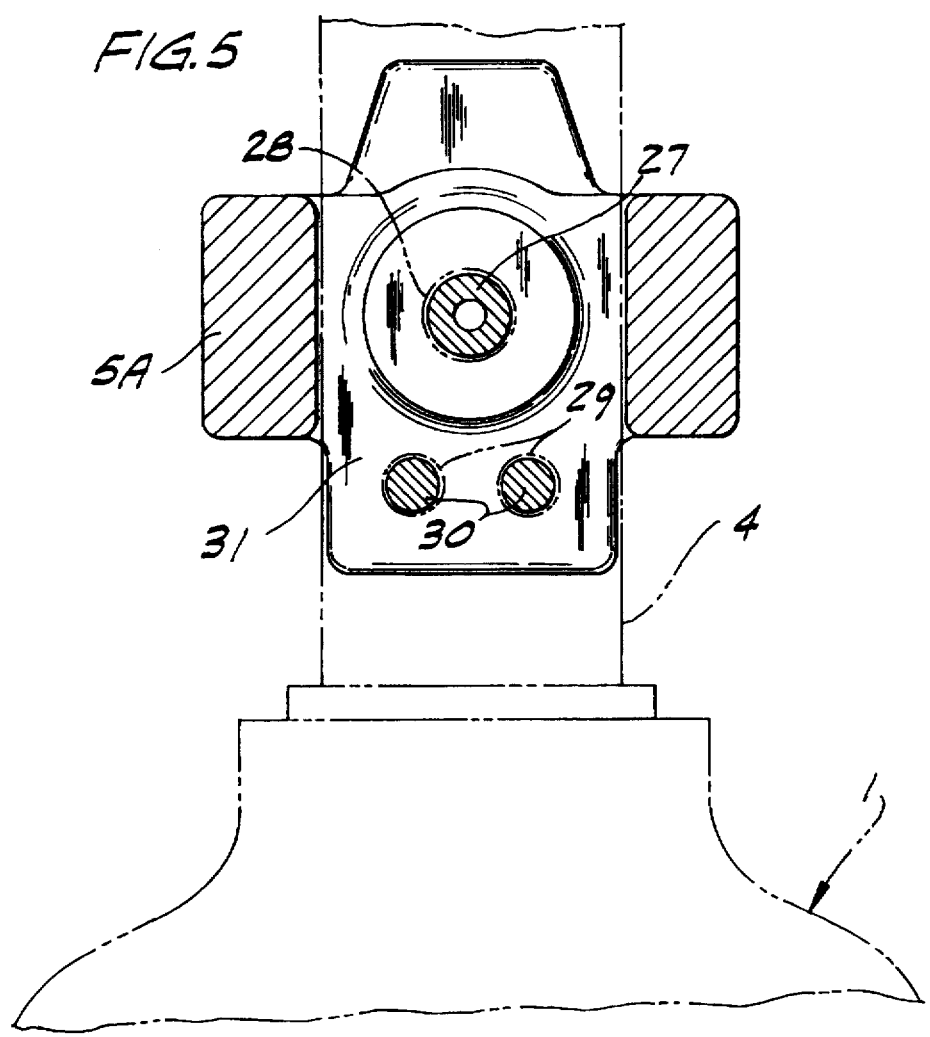
FIG. 5 is a section taken in the plane including line 5—5 of FIG. 2, and showing discriminating locators and gas coupling members of the yoke and the valve body.

Referring now to FIG. 5, the valve body 4 and the yoke ring 5 are equipped with first discriminating locators and second discriminating locators, respectively, to prevent the yoke from coupling the gas passaging structure 6 to a gas tank containing a gas other than a particular selected gas (i.e., in this case, oxygen). In the illustrated embodiments, the first discriminating locators are holes 29 in the valve body 4, and the second discriminating locators are pins 30 extending outwardly from the enlarged side 31 of the yoke 5 and facing the valve body 4. The invention can be accomplished using one or more pins. Pin and hole arrangements are not limited to varying the relative positions of the pins and holes, but also includes varying their shapes.

In FIG. 5, the holes 29 on the valve body 4 (shown in phantom) have an arrangement selected to correspond to the particular gas in the gas tank 1, such as oxygen. The side 31 of the yoke 5 to which the gas passaging structure 6 is connected is enlarged to accommodate the pins 30 facing inward toward the valve body 4. The pins 30 have an arrangement on the enlarged side 31 of the yoke 5, selected to correspond to a particular gas, such as oxygen. As the yoke 5 is drawn toward the valve body 4 by the turning of the set screw 14, the pins 30 on the yoke are drawn toward the holes 29 on the valve body. The arrangement of the holes 29 corresponds to the particular gas (oxygen) in the gas tank 1, and the pins 30 on the yoke 5 mate with the holes 29 on the valve body 4. The coupling stem 27 extends through the yoke 5 and into the generally central opening 13 a limited amount such that the coupling stem 27 will engage the valve orifice 28 of the valve body 4 only when the pins 30 and holes 29 are properly mated. When an arrangement of holes on a valve body (not shown) does not correspond to the arrangement of pins 30 which has been preselected for oxygen, the pins will not mate with the holes 29 on the valve body 4, thus preventing the coupling stem 27 and valve orifice from interengaging. Failure of the coupling members 29, 30 to interengage indicates that the gas in the tank 1 is not the kind which the gas passaging structure 6 was calibrated to deliver.

Figure 6:
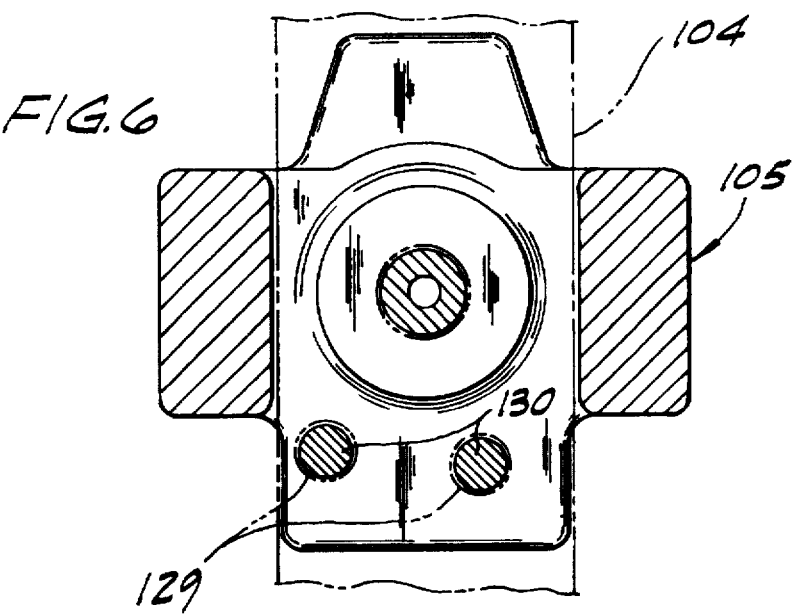
FIG. 6 is a view similar to FIG. 5 but showing discriminating locators of another embodiment.

FIG. 6 shows an arrangement of pins 130 on a yoke 105 that is different than the arrangement of pins 30 shown in FIG. 5, and corresponds to a second particular gas that is different than the particular gas (oxygen) to which the arrangement of pins 30 shown in FIG. 5 corresponds. Holes 129 on a valve body 104 (shown in phantom) have an arrangement corresponding to that of the pins 105. However, the yoke 105 having the arrangement of pins 130 shown in FIG. 6 could not be used to connect gas passaging structure 6 to a gas tank valve body 4 having the arrangement of holes 29 shown in FIG. 5.

In operation, the yoke 5 is slid down over the valve body 4 until the set screw 14 is aligned with the indentation 16 in the valve body and the coupling stem 27 of the gas passaging structure 6 is aligned with the valve body orifice 28. The torque rod 20, used in any of the embodiments shown, is grasped and rotated about the longitudinal axis of the set screw 14 until the set screw securely seats in the indentation 16 in the valve body 4. If the patient cannot secure the yoke 5 to the valve body 4 by using the torque rod 20, the wrench 9 may be used as an alternative to the torque rod or to augment the torque rod. The wrench 9 is placed over the flats 18 on the set screw 14, grasped at its outer end and rotated about the longitudinal axis of the set screw. When the set screw 14 is sufficiently tightened, the locator members 29, 30 of the valve body 4 and yoke 5, respectively, will mate. The coupling stem 27 of the gas passaging structure 6 will seat properly in the valve orifice 28, and the yoke 5 will be held in a fixed, self-retained position on the valve.

The wrench 9 is removed from the set screw 14 and placed over the flats 7 on the valve stem 3 as shown in phantom in FIG. 1. By grasping the outer end of the handle 10 of the wrench 9 and rotating it about the longitudinal axis of the valve stem 3, the valve opens and allows gas to flow from the gas tank 1 to the gas passaging structure 6. The flow is thereafter controlled by turning the gas flow knob 26 of the gas passaging structure 6.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed:

1. In combination, a gas tank valve and a yoke for mounting gas passaging structure on the valve, the gas tank valve comprising a valve body and a valve stem mounted on the valve body for turning relative to the body in a first direction to open the valve and in a second direction opposite the first to close the valve, the valve stem having a pair of flats on opposite sides of the valve stem adapted to be engaged by a wrench for turning the valve stem, the pair of flats being spaced apart a first distance, and the yoke comprising a generally central opening sized and shaped for receiving at least a portion of the valve body therethrough, a set screw adapted to extend through the yoke and threadably engage the yoke, the set screw having an inner end portion capable of engaging the valve body in the central opening of the yoke for releasably mounting the yoke on the valve body, and an outer end portion extending outwardly from the yoke, the outer end portion having a pair of flats on opposite sides of the set screw adapted to be engaged by the wrench for turning the set screw into engagement with the valve body, the flats on the set screw being spaced apart a second distance substantially equal to the first distance by which the flats of the valve stem are spaced apart, whereby the same wrench used for turning the valve stem may be used for turning the set screw, and a torque rod connected to the set screw for conjoint rotational movement with the set screw about the longitudinal axis of the set screw for applying torque to the set screw for turning the set screw to bring it into secure engagement with the gas tank valve thereby to hold the yoke in a fixed, self-retaining position on the valve.

2. A combination as set forth in claim 1 wherein the torque rod is fixedly connected to the set screw.

3. A combination as set forth in claim 2 wherein the torque rod extends laterally away from the set screw a substantially equal distance from both sides of the set screw.

4. A combination as set forth in claim 2 wherein the torque rod extends laterally away from the set screw a maximum distance on a first side of the screw and a minimum distance on a second side of the screw, the maximum distance providing a maximum lever arm for applying torque to the set screw for turning the set screw.

5. A combination as set forth in claim 2 wherein the set screw has a diametrical hole in which the torque rod is received.

6. A combination as set forth in claim 2 wherein the set screw and valve stem each comprise curved surfaces extending between the flats on opposite sides of the set screw and valve stem, the curved surfaces of the set screw having the same shape as the curved surfaces of the valve stem.

7. A combination as set forth in claim 6 wherein the first and second distances separating the flats on the valve stem and set screw, respectively, equal approximately 0.2 inches.

8. A combination as set forth in claim 1 wherein the torque rod is connected to the set screw for lateral movement relative to the set screw between a stowed position in which the rod extends laterally away from the set screw a minimum distance, and a use position in which the torque rod extends laterally outwardly from the set screw a maximum distance, in the use position the torque rod having a maximum lever arm for applying torque to the set screw for turning the set screw.

9. A combination as set forth in claim 8 wherein the torque rod is free of a fixed connection to the set screw.

10. A combination as set forth in claim 8 wherein the set screw has a diametrical hole therethrough slidingly receiving the torque rod.

11. A combination as set forth in claim 8 wherein the set screw and valve stem each comprise curved surfaces extending between the flats on opposite sides of the set screw and valve stem, the curved surfaces of the set screw having the same shape as the curved surfaces of the valve stem.

12. A combination as set forth in claim 11 wherein the first and second distances separating the flats on the valve stem and set screw, respectively, equal approximately 0.2 inches.

13. A combination as set forth in claim 1 in combination with the gas passaging structure, the gas passaging structure comprising a first gas coupling member supported by the yoke, passaging means extending from the first coupling member, and a gas measurement device disposed in said gas passaging means, the measurement device being calibrated for a particular gas, and wherein the gas tank valve further comprises a second gas coupling member sized and shaped to sealingly couple with the first coupling member, and a first discriminating locator on the valve body, the first discriminating locator being constructed to correspond to the particular gas in the tank, and further wherein the yoke comprises a second discriminating locator capable of mating with the first locator and permitting the first coupling member of the gas passaging structure to couple with the second coupling member on the valve only when the second locator mates with the first locator.

14. A combination as set forth in claim 13 wherein the valve body has an indentation therein sized and shaped for receiving the inner end of the set screw.

* * * * *